Feb. 19, 1963     J. C. KYLE     3,078,449
COMMUTATING AND MODULATING APPARATUS
Filed Sept. 24, 1958     5 Sheets-Sheet 2

INVENTOR.
JAMES C. KYLE
BY
Christie, Parker & Hale
ATTORNEYS

Feb. 19, 1963 J. C. KYLE 3,078,449
COMMUTATING AND MODULATING APPARATUS
Filed Sept. 24, 1958 5 Sheets-Sheet 4

INVENTOR.
JAMES C. KYLE
BY
Christie, Parker & Hale
ATTORNEYS

Feb. 19, 1963

J. C. KYLE

3,078,449

COMMUTATING AND MODULATING APPARATUS

Filed Sept. 24, 1958

INVENTOR.
JAMES C. KYLE
BY
Christie, Parker & Hale
ATTORNEYS

United States Patent Office

3,078,449
Patented Feb. 19, 1963

3,078,449
COMMUTATING AND MODULATING APPARATUS
James C. Kyle, Glendora, Calif., assignor, by mesne assignments, to Consolidated Electrodynamics Corporation, Pasadena, Calif., a corporation of California
Filed Sept. 24, 1958, Ser. No. 763,112
10 Claims. (Cl. 340—183)

This invention relates to an apparatus for commutating and modulating electrical signals.

Data acquisition in many applications requires the sampling of a large number of datum points and the reproduction of these samples in another form. For example, in applications such as flight test instrumentation in manned aircraft, unmanned aircraft and missiles and in engine test stand installations, it is necessary to measure variations of a large number of parameters. Electromechanical transducers are particularly suited to present parameters such as pressure, temperature, acceleration, displacement and the like in the form of electrical signals, the amplitudes of which vary with the magnitude of the parameters under investigation. Since large numbers of transducers are frequently used in various installations, it becomes desirable to provide some means for accepting voltage signals from the numerous transducers, sampling these signals in a time sequence and producing an output of sampled signals.

Two considerations are of importance in data acquisition applications such as those described previously. First, it is necessary to commutate the electrical signals received from the large number of transducers in order to achieve economy of weight and cost. Second, it is necessary to provide an accurate measurement of low-amplitude signals received from the signal sources.

The two considerations referred to above have not been entirely resolved in prior devices. The problems attendant upon commutation of a large number of input signals consistent with accurate measurement of low-amplitude signals may be illustrated by a galvanometer as an electrical device for accepting voltage signals from a large number of signal sources, which signals are to be sampled. If, consistent with the requirements for proper sampling, a single galvanometer is required to respond to a large number of input signals, the galvanometer must have a high natural frequency. As the number of input signals to which the galvanometer must respond increases, the required natural frequency of the galvanometer similarly increases. In addition to the decreased sensitivity which is characteristic of galvanometers having high natural frequencies, such a characteristic means that the galvanometer has what may be termed a wide "band pass." In other words, the galvanometer responds to a wide range of frequencies. Theerfore, the inherent filtering characteristic of galvanometers in eliminating or minimizing the effect of unwanted frequencies cannot be effectively utilized. This becomes particularly important in the measurement of low frequency signals to which the commutating and modulating apparatus of the present invention is particularly directed.

Measurements of small input signals frequently cannot be made with required accuracy because of the presence of noise or interference signals in the system. This problem becomes particularly acute in installations subject to either or both mechanical vibrations and interference from other closely-packaged electrical devices. Where the signals of interest are of low frequency, a galvanometer may be selected which has a flat frequency response to the highest frequency of the signals of interest but which has a low response to higher frequencies. Since noise or interference signals are generally characterized by a high frequency, a galvanometer may therefore be effectively used to filter out noise signals and to provide an accurate measurement of the low frequency signals of interest. In general, the frequency response of a galvanometer falls off rapidly above its natural frequency. Therefore, utilization of a galvanometer as described above requires the selection of a galvanometer having a natural frequency above the highest frequency of the signals of interest and below the frequencies of noise or interference signals. The use of a galvanometer to respond to a large number of signals, with the attendant requirement for a high natural frequency, prevents filtering of the unwanted frequencies.

A second problem where a single electrical device such as a galvanometer is required to respond to a large number of input signals arises because sampling of the applied signal must occur almost immediately after the signal is accepted. In electrical devices such as a galvanometer, there is a transient period which may be described as the period during which a dynamical system is not in a steady state. For example, the variations in amplitude immediately following coupling of a signal source to a measuring device by a switch, known as "switch bounce," occur during the transient period. In a galvanometer, the period for the suspension to reach a true full signal deflection is the transient period. It is apparent that samples taken during the transient period of an electrical device produce inaccurate values. Where. consistent with requirements for proper sampling, an electrical device is required to respond to a large number of input signals, sampling frequently occurs during transient periods because of the small period of time during which a signal is applied to the electrical device.

The problems discussed above are also present where other electrical devices are required to respond to a large number of input signals. For example, a capacitor utilized in such a manner would be required to pass a wide range of frequencies. If, on the other hand, the frequency response of a capacitor is reduced by increasing the value of its time constant, the product of its resistance and capacitance, it would be necessary to sample during a transient period.

It is recognized that a single electrical device such as a galvanometer can be used to provide accurate responses to a relatively large number of input signals when such signals are static or quasi-static. This is achieved, however, only because it is possible to define properly the characteristics of such signals by sampling at a very low rate. Where the frequency of the signal increases above the quasi-static level, a very low rate of sampling becomes inadequate and the problems discussed above are introduced.

The commutating and modulating apparatus of the present invention avoids both of the problems previously discussed and provides a means for commutating a large number of input signals in the low frequency range to provide an accurate measurement of such signals. The present invention is a commutating and modulating apparatus comprising a plurality of electrical devices responsive to the amplitude of input electrical signals and a plurality of input signal sources. Means are provided for individually coupling electrically the signal sources and the electrical devices for a fixed period of time. Means are also provided for scanning serially each electrical device at a time during the fixed period of time and at a predetermined rate. As the signal sources and electrical devices are coupled for a fixed period of time, the scanning of each electrical device serially can be arranged so that sampling occurs only during a steady state condition, thereby eliminating the inaccuracies produced by sampling during transient periods. Means for providing output signals having a duration which varies with the amplitude of the input signal at the time of scanning are associated with the scanning means. While the plurality of signal sources may be equal to the plurality of electrical devices, the plurality of signal sources is generally multiple times greater than the plurality of electrical devices.

According to one embodiment of the invention, galvanometers are utilized as the electrical devices in the commutating and modulating apparatus. A mirror is mounted on a suspension within each galvanometer and is deflected through an angle proportional to the amplitude of an input signal applied to the galvanometer. Light beams, reflected from each mirror at an angle determined by the angle of deflection of the mirror, are serially scanned by an aperture in a rotating member. The aperture is shaped so that the time during which light beams pass through it is dependent upon the angle of deflection of the mirror, as fully described in my copending application entitled "Pulse Duration Modulation Measuring Devices," Serial No. 761,174, filed September 15, 1958, now abandoned. The apparatus is arranged whereby light beams passing through the aperture strike a light responsive device, such as a photomultiplier tube. In this manner, the light responsive device produces an output having a time duration proportional to the instantaneous amplitude of the input signal applied to each galvanometer at the time of scanning.

The advantages of the commutating and modulating apparatus of the present invention may be illustrated by reference to the use of galvanometers as the electrical devices. If, for example, the input signals of ninety signal sources such as transducers are to be sampled, a comparison may be made for the situations where the plurality of galvanometers is two and fifteen. When two galvanometers are used, each group of signal sources consists of two signal sources. If the signal sources are identified by numbers from 1 through 90, which are to be sampled consecutively, and if the galvanometers are identified by the numbers 1 and 2, the groups consisting of signal sources 1 and 2, 3 and 4, 5 and 6, 7 and 8 and so on to 89 and 90 are each successively coupled to galvanometers 1 and 2 respectively. This means that galvanometer 1 is time-shared by forty-five signal sources identified by the odd numbers and galvanometer 2 is timed-shared by forty-five signal sources identified by the even numbers. If the time for switching is regarded as substantially instantaneous, the fixed period of time for which each signal source is coupled to a galvanometer can be the time required to sample the two applied signals. It is apparent that the signal from each signal source of the group is retained twice as long as would be the case if a single galvanometer were used to sample the ninety signal sources. The problem of sampling during the transient period is correspondingly minimized.

When fifteen galvanometers, identified by the numbers 1 through 15, are used, each group of signal sources consists of fifteen signal sources. This means that each galvanometer is time-shared by six signal sources. Galvanometer 1 is time-shared by signal sources 1, 16, 31, 46, 61, 76; galvanometer 2 is time-shared by signal sources 2, 17, 32, 47, 62, 77 and so on to galvanometer 15 which is time-shared by signal sources 15, 30, 45, 60, 75, 90. The fixed period of time for which each signal source can be coupled to a galvanometer is increased to the time required to sample the fifteen applied signals.

It can be seen that the fixed time for which each group of signal sources is coupled to the galvanometers can be increased as the number of galvanometers approaches the number of signal sources. Consistent with other requirements, therefore, selection of the number of inputs time-sharing each galvanometer can be made to insure that sampling occurs only after a steady state condition is reached and the inaccuracies attendant upon sampling during transient periods are avoided. Furthermore, the natural frequency of the galvanometers which can be used decreases rapidly with decrease in the signal source to galvanometer ratio. Accordingly, the commutating and modulating apparatus of the invention derives the advantages of utilizing the filtering characteristics of the galvanometers to measure accurately low frequency signals.

In the apparatus of the invention, the electrical devices, such as the galvanometers, act as a modulator. For example, where there are ninety signal sources and fifteen galvanometers as previously illustrated, each galvanometer is coupled to an applied signal for a fixed period of time, which signal is sampled at a predetermined fraction of the fixed period of time selected to insure a steady state condition. During one cycle wherein each of the ninety signal sources are sampled, the instantaneous amplitude of a predetermined number of samples of each of six input signals is scanned for each galvanometer. This may be termed pulse amplitude modulation. In addition, the instantaneous amplitude is pulse duration modulated to produce an output having a time duration proportional to the instantaneous amplitude of the input signal. These output pulses of variable duration may be stored in suitable storage devices for later use or they may be employed to modulate a transmitter and send signals to receiving equipment.

The multiple modulation described above is achieved in the apparatus according to the invention together with commutation of input signals received from a large number of signal sources to a lesser number of electrical devices such as galvanometers. Furthermore, the input signals applied to the plurality of galvanometers are commutated to a single light responsive device from which a continuous output of duration modulated pulses is provided.

In addition to the advantages already described, the use of galvanometers in the commutating and modulating apparatus according to the invention derives the benefits of a low impedance input and isolation of internal circuitry from external circuitry.

The features and advantages of the apparatus for commutating and modulating electrical signals according to the present invention will be more clearly understood from the following description made in conjunction with the accompanying drawings in which.

Figure 1:
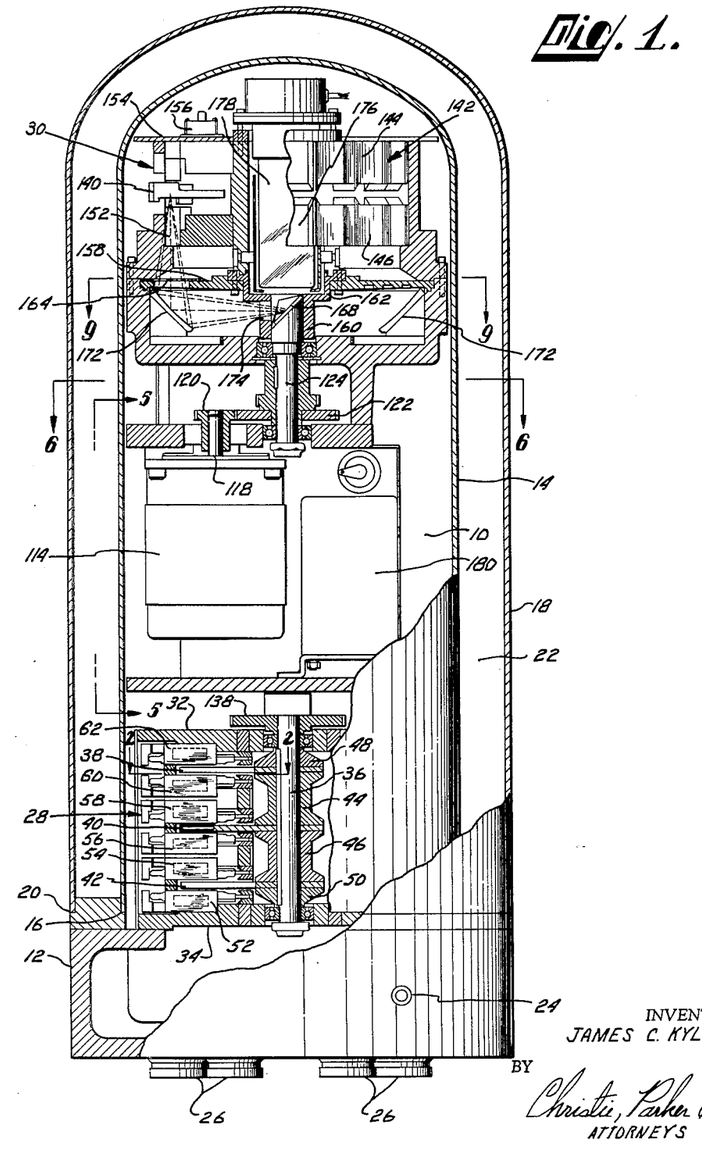
FIG. 1 is a partially-sectioned elevation of one embodiment according to the present invention.

With reference to FIG. 1, one embodiment of the commutating and modulating apparatus of the present invention is shown. In this embodiment, a fluid-tight main chamber 10 is defined by a cylindrical base 12 and an inner cylindrical cover 14 closed at one end by a rounded top. The inner cover is fitted in a circular groove 16 located inwardly from the edge of the base. An outer cylindrical cover 18 is fitted in a circular groove 20 located at the edge of the base so that a pressure lock chamber 22 is defined between the inner cover and the outer cover. Fluid-tight seals are formed between each of the covers and the base through the use of suitable sealing means such as O rings for example. A pressurizing connection 24 is fitted in the base so that the main chamber may be pressurized with a suitable dry gas such as air or nitrogen. A pressure gauge (not shown) may also be joined to the base to permit observations of the main chamber pressure.

Signal input receptacles 26 are fitted through the bottom plate of the base. Leads from signal sources such as transducers (not shown) are connected through the receptacles to a switching section 28 within the main chamber. The apparatus can accept either differential or single ended voltage signals from various transducers and reference sources and is particularly suited to measurement of low amplitude signals. Although the commutating and modulating apparatus of the present invention may be adapted to a wide range as to numbers of input signals, the embodiment herein described is adapted to ninety input signals to be commutated and modulated. It will be understood, however, that the apparatus according to the invention may be adapted by suitable modifications to handle more or less than ninety input signals.

Switching section 28 commutates the input signals and feeds the commutated signals to a galvanometer section 30. A magnetic switch such as that described in a copending application entitled "Magnetic Switch," Serial No. 748,375, filed July 14, 1958, now U.S. Patent 3,013,137, and assigned to the same assignee, is particularly suited for high speed sampling of low level signals. Accordingly, the switching section of the preferred embodiment of the commutating and modulating unit comprises switching means as described in that application, although it will be understood that the apparatus may be adapted for use of other suitable switching arrangements.

Figures 2, 3, 4, 7:
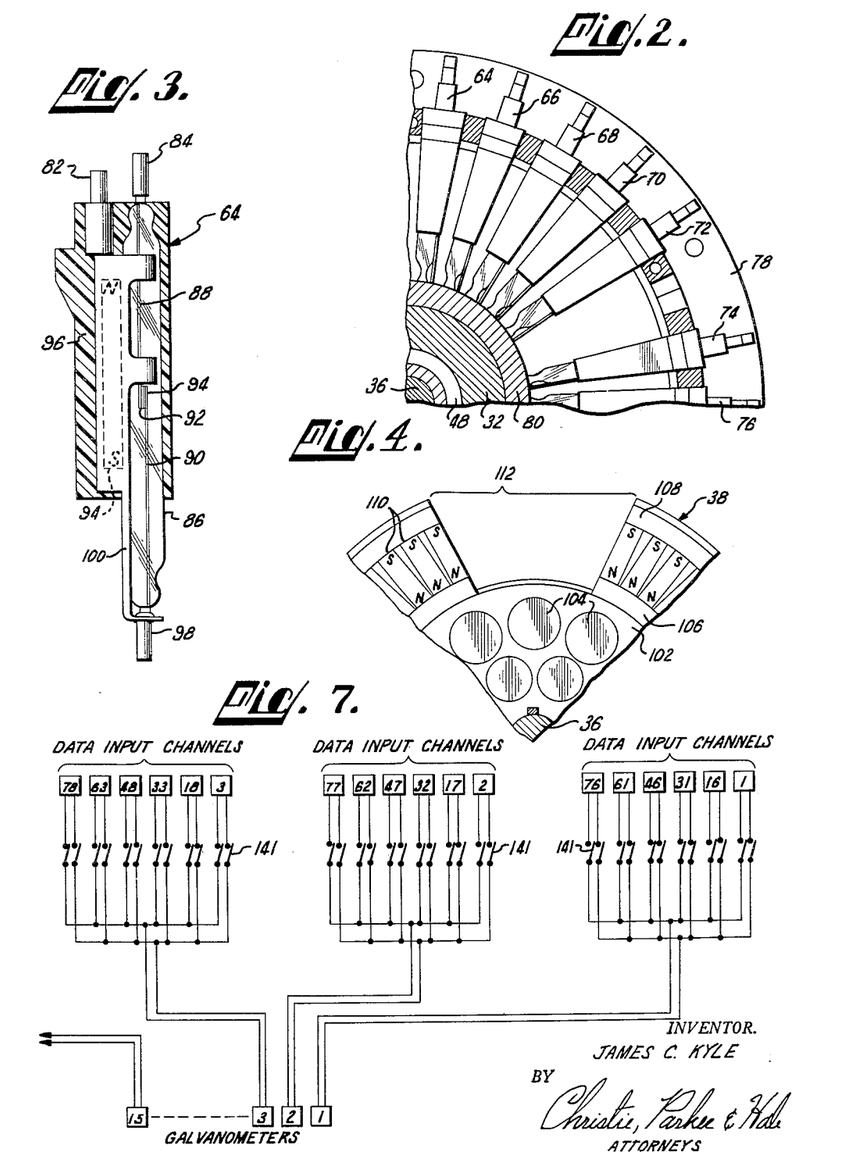
FIG. 2 is a fragmentary cross-sectional view taken generally along line 2—2 of FIG. 1 and illustrates a plurality of individual magnetic switches of a switch assembly.
FIG. 3 illustrates in greater detail an individual magnetic switch, partially sectioned.
FIG. 4 is a fragmentary plan view illustrating in greater detail the magnetic actuating disk assembly.
FIG. 7 is a schematic diagram showing in part the electrical connections between the switching section and the galvanometer section.

Switching section 28 includes end plates 32 and 34 disposed on opposite ends of a shaft 36. Three magnetic actuating disks 38, 40 and 42 are spaced along the shaft by a pair of inner spacers 44 and 46 and a pair of outer spacers 48 and 50. A plurality of switch assemblies 52, 54, 56, 58, 60, 62 are disposed in a stationary position. Each switch assembly is arranged in the manner of switch assembly 60 as shown in FIG. 2. A plurality of individual magnetic switches 64 through 76 are disposed on a stationary supporting plate 78 to extend around the periphery of the associated magnetic actuating disk. In the embodiment herein described, each of the six switch assemblies have thirty individual magnetic switches disposed in this manner providing a total of 180 individual magnetic switches. Two switch assemblies are associated with each rotatable disk. Switch assembly 60 is disposed below and switch assembly 62 is disposed above magnetic actuating disk 38 so that the individual magnetic switches of each assembly are respectively positioned immediately below and immediately above the rotatable disk as shown in FIG. 1. Switch assemblies 56, 58 are similarly associated with disk 40 and switch assemblies 52, 54 are similarly associated with disk 42. Each individual magnetic switch is secured to its switching assembly in the manner particularly shown in FIG. 2 for switch assembly 60, wherein each switch is friction fitted in an aperture in a circular insulation ring 80 positioned near the center of each switch assembly.

The details of individual magnetic switch 64 are particularly shown in FIG. 3, the remaining individual magnetic switches being identical in construction. The switch includes a pair of terminals 82, 84 and a glass envelope 86 within which a pair of flexible switch arms 88, 90 are disposed. Switch contacts 92, 94 are positioned at adjacent ends of switch arms 88 and 90 respectively. The switch arms are mechanically biased by reason of an intrinsic spring force so as to be in a normally open position. However, a magnetic field supplied by a magnet 94 counteracts the spring bias to hold the contacts in a closed position in the absence of any nullifying force. An insulator 96 is fitted to retain the magnet and the glass envelope. Terminal 82 is connected to a metallic tip 98 and switch arm 88 by a conductive member 100.

The details of magnetic actuating disk 38 are particularly shown in FIG. 4, disks 40, 42 being identical in construction to disk 38. The disk assembly comprises a hub 102 having a plurality of holes 104 spaced within the hub and filled with a suitable weighting material such as lead in order to balance the disk and reduce mechanical vibrations. A first circular ring 106 is joined to the periphery of the hub to provide an inner pole piece. A second circular ring 108 is joined to the periphery of the disk to provide an outer pole piece. Within the annular ring formed between the first and second circular rings, a plurality of magnets 110 are distributed with their opposite ends in contact with the first and second circular rings. In this manner, the inner pole piece is magnetized with one polarity and the outer pole piece is magnetized with the opposite polarity. The magnets are positioned on the disk so as to be substantially aligned with the magnets of the individual magnetic switches arranged on the switch assemblies as previously described. A gap 112 is formed in the periphery of the disk assembly to provide a section having no magnetic field. In the embodiment herein described, the gap in each of the magnetic actuating disks extends over an arc of approximately 50°.

In the operation of the switching section, magnetic actuating disks 38, 40, 42 are rotated by driving shaft 36 in a manner hereinafter described. A description of the operation of magnetic actuating disk 38 with respect to its associated switch assemblies 60, 62 illustrates the manner of operation of each of the other two disks and their associated switch assemblies. At any given time during rotation of disk 38, the individual magnetic switches of switch assemblies 60, 62 are subject to the magnetic field of magnets 110 of the disk except those individual magnetic switches directly above and below the gap in the disk. In these latter individual magnetic switches, the magnetic field supplied by the magnet within the switch remains unaffected and acts against the spring bias to hold the contacts in a closed position. However, since the poles of the magnets in the disk are oriented oppositely to the poles of the magnet in the individual magnetic switches, the magnetic field supplied by the magnet in the switch is nullified by the magnetic field of the disk magnets in those switches subjected to the latter magnetic field. As a result, the intrinsic spring bias of the switch arms within each individual switch, no longer being overcome by the magnetic field of the individual switch magnet, opens these switches. It is seen therefore that, as the magnetic actuating disks are rotated, the individual magnetic switches on either side of each disk are sequentially closed for a relatively short period, as determined by the width of the gap, and then opened for a relatively long period. In the embodiment herein described, the three magnetic actuating disks are arranged on shaft 36 so that the gaps of the disks are staggered or displaced by about 4°, one from the other, so as to provide proper switching sequence.

Figure 5:
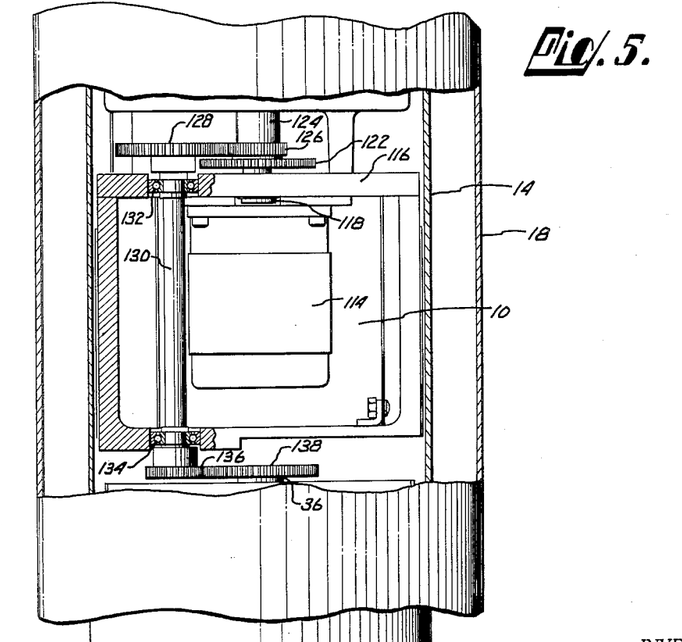
FIG. 5 is a view taken generally along line 5—5 of FIG. 1 showing the drive assembly.
Figures 6, 9, 10, 11:
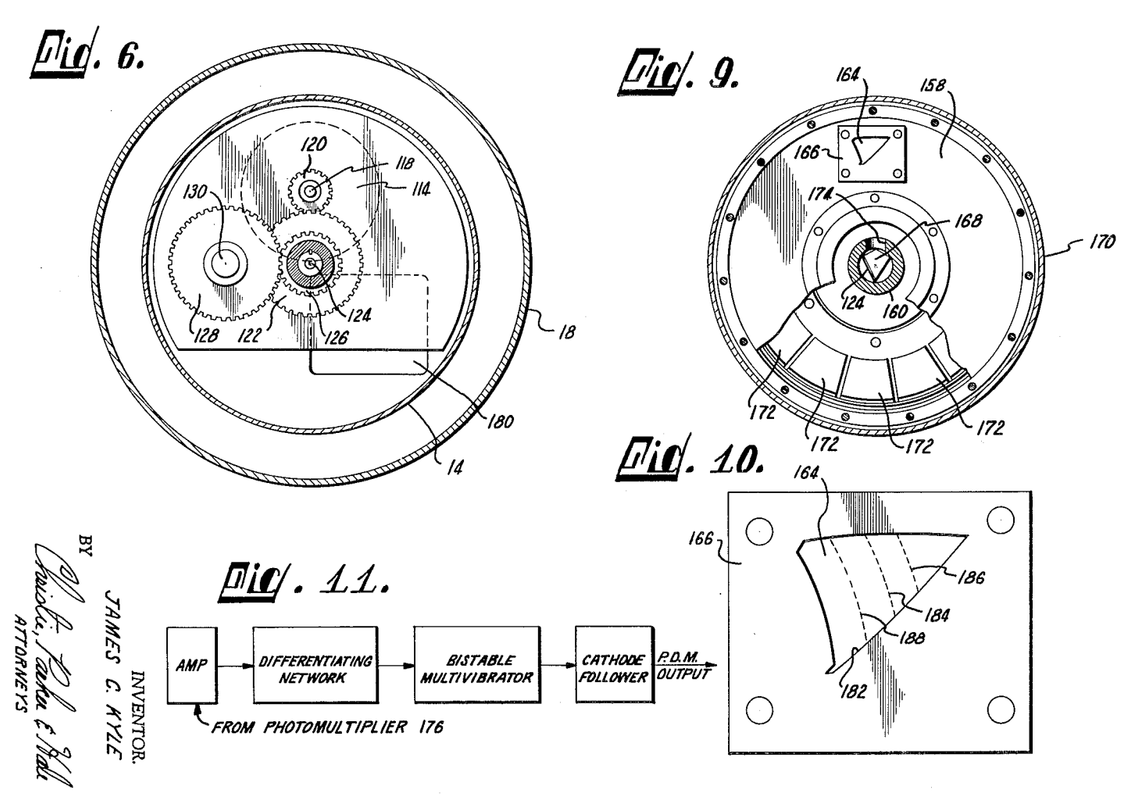
FIG. 6 is a view taken generally along line 6—6 of FIG. 1.
FIG. 9 is a view of the commutating disk, partially broken away, taken along line 9—9 of FIG. 1.
FIG. 10 is an enlarged view of the aperture removed from the commutating disk.
FIG. 11 is a block diagram of the electronic circuit.

With reference to FIGS. 5 and 6, the means by which magnetic actuating disk shaft 36 of switching section 28 is driven is illustrated. A motor 114 is mounted on a frame member 116 within the main chamber of the unit.

A drive shaft 118 extends vertically upwardly from the motor and has a pinion gear 120 mounted at its upper end. The pinion gear is meshed with a commutating disk drive gear 122 mounted on a commutating disk shaft 124. A secondary gear 126, mounted on the commutating disk shaft above gear 122 is meshed with a drive gear 128 mounted on a countershaft 130. The countershaft, mounted in bearings 132, 134, extends downwardly and is geared through gears 136 and 138 to magnetic actuating disk shaft 36. In the embodiment described herein, the gear ratio is such that magnetic actuating disk shaft 36 is driven at 75 revolutions per minute while commutating disk shaft 124 is driven at 450 revolutions per minute or 8 times faster.

The commutated signal inputs from switching section 28 are fed through electrical leads enclosed in a metal trough (not shown) to galvanometer section 30, to be described in greater detail hereinafter. In the embodiment described herein, fifteen galvanometers, of which a single galvanometer 140 is shown in FIG. 1, are included in the galvanometer section. Each galvanometer is connected to the input signals received through connectors 26 by a circuit in which each side of the galvanometer circuit has an individual magnetic switch in series between the input terminal and the galvanometer. For convenience, each pair of individual magnetic switches for each input channel is referred to as a data channel switch. Accordingly, the 180 individual magnetic switches of the switching section previously described form 90 data channel switches placed in each of the 90 data input channels.

The manner in which each of the fifteen galvanometers of the galvanometer section is time-shared by the signal sources is schematically illustrated in FIG. 7. Three groups of data input channels or signal sources identified by the numbers in the upper boxes as shown are adapted for coupling by data input switches 141 to three galvanometers, identified by the numbers in the lower boxes. Each of the three galvanometers depicted in FIG. 7 as well as each of the remaining galvanometers is time-shared by six separate data input channels in a cyclic sequential manner. The data channel switches, each composed of two individual magnetic switches, are closed in consecutive numerical order by rotation of the magnetic actuating disks according to the manner previously described. The closing of a data channel switch couples a galvanometer and data input channel or signal source. With the time-sharing arrangement illustrated in FIG. 7, the following occurs in sequence: data input channels 1, 2, 3 through 15 (not shown) are successively coupled by closing of their respective data channel switches to galvanometers 1, 2, 3 through 15; data input channels 16, 17, 18 through 30 (not shown) are successively coupled by closing of their respective data channel switches to galvanometers 1, 2, 3 through 15; data input channels 31, 32, 33 through 45 (not shown) are successively coupled by closing of their respective data channel switches to galvanometers 1, 2, 3 through 15. The same sequence is followed until all data input channels have been interrogated whereupon the cycle is repeated in the same sequential manner. It can therefore be seen that galvanometers 1, 2, 3 are time-shared respectively by the data input channels identified by number in FIG. 7 and that the remaining galvanometers are similarly time-shared by six data input channels, as, for example, galvanometer 15 which is time-shared by data input channels 15, 30, 45, 60, 75, 90. Due to the switching configuration and the principle of time-sharing as applied to the galvanometers, only one data channel switch is closed in the input circuit to any one galvanometer at a time.

If the switching time is regarded as substantially instantaneous, the fixed time during which each data input channel or signal source can remain coupled to its galvanometer is the time required for sampling the fifteen galvanometers. In practice, however, the time may be somewhat less, dependent upon the total time required for sampling. In the embodiment herein described, at a commutation rate of 112.5 samples per second ($45 \times 2.5$ wherein 45 refers to the number of signal sources sampled and 2.5 refers to the number of samples per second), $12 \pm 1$ consecutive data channel switches are closed at any one time. To illustrate, if data channel inputs 3 through 14 are coupled to their respective galvanometers by closing of the respective data channel switches, data channel input 15 is coupled to its galvanometer by closing of its data channel switch when data channel switch 3 opens. Incrementally, data channel inputs 16, 17, 18 are coupled to their respective galvanometers as data channel switches 4, 5, 6 are opened. The number of data channel switches closed at one time is dependent upon the width of the gaps in the magnetic actuating disks and the displacement of these gaps, one from the other, on the magnetic actuating disk shaft. Accordingly, the number of data channel switches closed at one time may be changed by modifications of the magnetic actuating disks.

The external configuration of galvanometers suitable for use in galvanometer section 30 can be similar to the galvanometer described in Patent No. 2,733,407 issued to J. H. Lancor on January 31, 1956. A suitable galvanometer includes a pair of magnetizable pole pieces protruding from opposite sides of the galvanometer case. Within the galvanometer case, the galvanometer suspension includes a mirror and coil mounted between upper and lower suspension terminals. The coil is positioned in the air gap formed between the portions of the pole pieces extending within the case. On one side of the galvanometer, a window is provided so that a light beam from some external source may be focussed on the mirror. Light beams reflected from the mirror pass back out through the window.

Accuracy of measurements made in the commutating and modulating apparatus of the present invention depend to a certain extent upon proper selection of galvanometers. As previously discussed, the employment of galvanometers to filter out unwanted frequencies requires galvanometers with natural frequencies below the frequencies of interference signals, yet above the frequency of the signal to be measured. The characteristics of galvanometers and the effect of these characteristics in selection of galvanometers are described in detail in my previously referred to copending application, Serial No. 761,174, filed Sept. 15, 1958.

Figure 8:
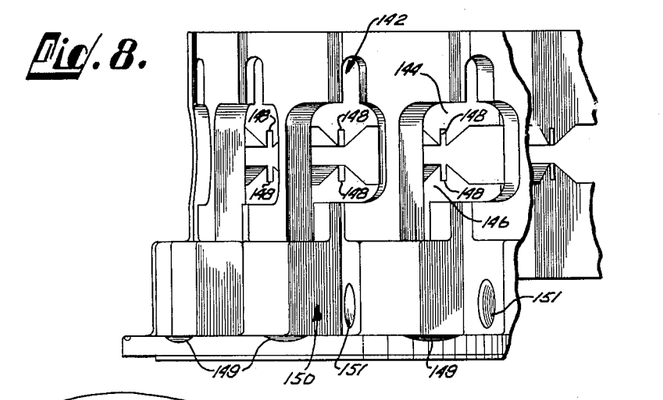
FIG. 8 is a fragmentary perspective view of the magnet block in place in the apparatus.

Galvanometer section 30 comprises a circular or ring magnet block 142 supported on a frame member 144 within the upper portion of the main chamber. The magnet block is formed from a permanent magnetic material and is constructed so that an upper portion 144 has a magnetic polarity opposite to that of a lower portion 146. A plurality of pairs of slots 148 are formed in the magnet block, one slot of each pair being in the upper portion of the magnet block directly above the other slot in the lower portion of the magnet block. The pairs of slots are spaced around the circumference of the magnet block to accommodate the fifteen galvanometers of the galvanometer section. The magnetizable pole pieces of each galvanometer snugly fit within each pair of slots. In this manner, the pole pieces of each galvanometer are magnetized by the upper and lower portions of the ring magnet block to have opposite magnetic polarities As illustrated by galvanometer 140 in FIG. 1, the galvanometer is held in the slots with its long axis in a horizontal position so that its light transmitting window faces the bottom portion of the magnet block. Individual light sources (not shown) are positioned in cupped grooves 149 adjacent a framework 150 encircling the ring magnet block, as particularly shown in FIG. 8. The light beam from each light source is directed through a light entry aperture 151 of the framework. Although not shown, each light entry aperture is angled so that the light beam strikes the mirror of the galvanometer associated with the aperture. The reflected light beam from each galvanometer passes through an opening 152 in the bottom portion of the magnet block. A heater plate 154 is joined to the top of the ring magnet block. A plurality of electrical heaters, such as heater 156, are mounted on top of the heater plate to heat the galvanometer section. A substantially constant temperature is maintained within the galvanometer section through the use of appropriate thermostatic controls.

A commutating disk 158 is mounted on commutating disk shaft 124 to be directly below the ring magnet block. The commutating disk is substantially flat and is mounted in a horizontal plane.

A sleeve 160 is fitted to the upper portion of commutating disk shaft 124 and joins the shaft to the disk by a flange 162 joined to the upper portion of the sleeve. The commutating disk shaft is driven by motor 114 through the gear train previously described. A commutating aperture 164 is provided in the commutating disk and is positioned to be substantially aligned with opening 152 in the bottom of the ring magnet block through which opening reflected light from the galvanometer mirrors passes. The shape of the commutating aperture is modified from that of a true triangle for reasons that will hereinafter become apparent. Since the aperture must conform to precise dimensions, it is more easily formed in a small aperture plate 166 which is then joined to the commutating disk to overlay a larger, less precise opening in the disk. The upper end of the commutating disk shaft is beveled to provide a surface at an inclination of 45°. A shaft mirror 168 is affixed to this inclined surface, as particularly shown in FIG. 9.

Immediately below the commutating disk, a cup-shaped support plate 170 is fitted with a plurality of mirrors 172, each shaped in the form of a toroid. The number of toroidal mirrors corresponds to the number of galvanometers and in the embodiment described herein equals fifteen. The mirrors are placed in an inclined position around the inner periphery of the upright portion of support plate 170, one mirror being substantially vertically aligned with each galvanometer. The mirrors are shaped so that a light beam reflected from a galvanometer mirror and passing through commutating aperture 164 strikes the toroidal mirror associated with the particular galvanometer and is reflected to shaft mirror 168 when an opening 174 in sleeve 160 is aligned with the particular toroidal mirror during rotation of the commutating disk shaft. The path of a light beam from a galvanometer mirror to the shaft is shown by dotted lines in FIG. 1.

A photomulitiplier tube 176, protected by a magnetic shield 178, is positioned directly above the shaft mirror so that light beams reflected from the shaft mirror are directed to the photomultiplier. The remaining electronic equipment is positioned in an electronic section 180. As particularly shown in a block diagram in FIG. 11, the electronic components in the embodiment described herein comprise in addition to the photomultiplier an amplifier, a differentiating network, a bistable multivibrator and a cathode follower.

Figure 12:
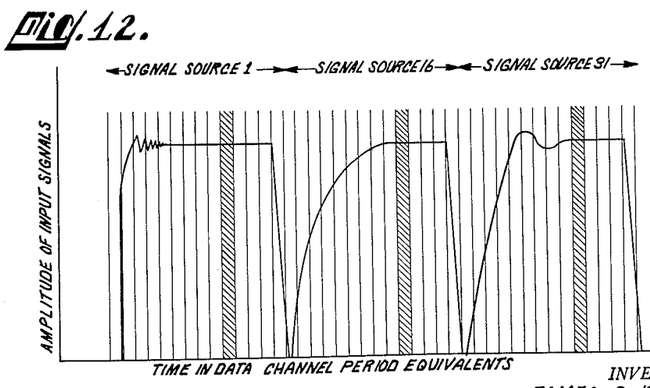
FIG. 12 is a curve illustrating sampling of signals applied to a galvanometer.

The operation of the commutating and modulating apparatus according to the present invention and the advantages obtained will be understood from the following description: The ninety input signals from the signal sources are fed through the data channel switches of the switching section and energize the fifteen galvanometers in the cyclic sequential manner previously described. As previously described, at a commutation rate of 112.5 samples per second, 12±1 consecutive data channel switches are closed at one time. The system is arranged whereby a signal input is applied to a galvanometer by closing of the data channel switch coupling the galvanometer and the signal source for a time equivalent to the closing of 8±1 data channel switches prior to sampling of the input signal by the commutating aperture traversing the reflected light beam from the galvanometer. The input signal remains applied to the galvanometer for a time equivalent to the closing of an additional 4±1 data channel switches. The time for closing of a data channel switch, which may be termed a data channel period, equals 8888.8 microseconds at the above-given commutation rate. The importance of this aspect of the invention in obtaining accurate data unaffected by transient periods is particularly illustrated in FIG. 12. The amplitude of input signals from signal sources 1, 16, and 31 are sequentially applied to galvanometer 1. For purposes of illustration only, the amplitudes of the signals from these different signal sources are taken as equal and it is assumed that no variations in each amplitude occurs at the signal sources during the time periods shown. These amplitudes are plotted against time in data channel period equivalents. It is to be understood that in practice that the signals from the different signal sources may vary considerably in amplitude. However, FIG. 12 serves to illustrate the importance of maintaining a signal on the galvanometer for a period sufficient to insure sampling during a steady state. The cross-hatched bars indicate the time of sampling. It can be seen, therefore, that, despite the transient periods of differing duration produced by switch bounce with respect to signal source 16, and underdamping with respect to signal source 31, accurate sampling is achieved by the apparatus of the present invention.

When an input signal reaches a galvanometer through a closed data channel switch, the galvanometer mirror is angularly deflected in direct proportion to the amplitude of the input signal. The light beam from the external light source which is directed onto the galvanometer mirror is accordingly displaced responsive to the angle of deflection of the galvanometer mirror. Commutating aperture 164 is shaped so as to pass a light beam therethrough for a period of time which varies with the angle of deflection of the galvanometer mirror. The shape of the commutating aperture departs from a true triangle to compensate for the fact that the velocity of points disposed radially on the disk increases as these points approach the periphery of the disk. Each galvanometer is positioned so that the light beam reflected from the galvanometer mirror moves in a plane parallel to side 182 of commutating aperture 164 when the side is aligned wtih the reflected light beam. When, for example, the amplitude of the input signal fed to a galvanometer deflects the mirror 50% of full scale deflection, the light beam reflected from the galvanometer mirror is in a position such that the path it traces across aperture 164 as the aperture rotates past the light beam is represented by dotted line 184 in FIG. 10. The length of line 184 is a measure of the time during which light passed through the aperture. Similarly, dotted lines 186 and 188 represent the time during which light passed through the aperture when the amplitude of the input signals deflected the galvanometer mirror 25% and 75% of full scale deflection, respectively. Since light beams passing through the aperture are reflected from the associated toroidal mirror and the shaft mirror to the photomultiplier tube, it is seen that the time duration of light passing through the aperture produces a voltage pulse which is a direct function of the amplitude of the input signal which deflected the particular galvanometer mirror. This is fully described in my previously referred to copending application, Serial No. 761,174, filed Sept. 15, 1958. The electrical output from the photomultiplier is a duration modulated voltage pulse.

It can be seen that the amplitude of the input signal applied to each of the fifteen galvanometers is sequentially sampled as the commutating aperture serially traverses the light beams reflected from each of the galvanometer mirrors. In this manner, the input signals applied to fifteen galvanometers are commutated to a single photomultiplier tube from which an output of duration modulated pulses are provided. The rate of sampling is dependent upon the speed of rotation of the commutating disk. In general, five samples per second of the highest frequency signal of interest are taken. Where a higher frequency response is required, the effective sampling rate can be increased by applying the same input signal to two or more input channels. Preferably, data input channels are selected which apply a signal to the same galvanometer. For example, with reference to FIG. 7, the effective sampling rate of a particular input signal can be increased by a factor of 3 without change in the rotation of the commutating disk by applying the particular signal input to data input channels 1, 16 and 31. While the total data channel input capacity is decreased, a higher frequency response is obtained.

The variable duration pulse obtained from the photomultiplier as described above is amplified and then differentiated in a differentiating network. The differentiated pulses trigger the bistable multivibrator circuit which produces output pulses having a voltage square wave. As shown in FIG. 11, the cathode follower provides a low impedance output which can be used to feed a magnetic tape recorder or other device. Alternatively, a high impedance output can be provided to drive a transmitter or other device.

While the description of the use of the commutating and modulating apparatus according to the invention has been primarily concerned with measuring low level signals, it is to be understood that it may equally well be employed to measure signals of intermediate or high levels with modification of the galvanometer input circuits as required. In addition, signal sources other than transducers can be used with the system according to the present invention.

Figure 13:
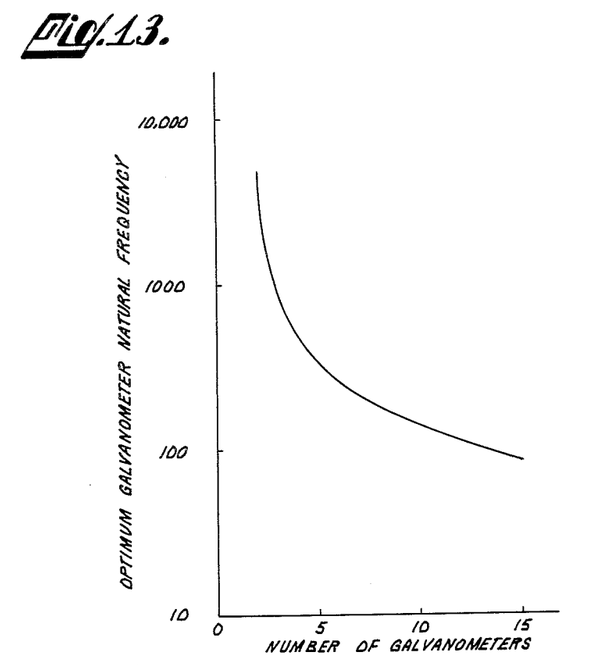
FIG. 13 is a curve showing change in optimum natural frequency with number of galvanometers in the apparatus according to the invention.

The embodiment of the apparatus according to the invention may be modified without departing from the concept of the invention. While the embodiment herein described has included a particular ratio of signal sources to galvanometers, namely 6 to 1, this ratio may be changed dependent upon the highest frequency of the signals to be sampled and the required sampling rate for the particular application. As illustrated in FIG. 13, the optimum natural frequency for galvanometers used in the apparatus is rapidly decreased with the number of galvanometers used. For example, from FIG. 13 it can be seen that values of galvanometer optimum natural frequencies of 1700 c.p.s., 350 c.p.s., 135 c.p.s. and 84 c.p.s. can be used when the numbers of galvanometers are 2, 5, 10 and 15 respectively. Selection of the proper number of galvanometers can therefore be made so as to achieve the filtering of unwanted frequencies required by the particular application. It is to be understood, however, that this selection is also controlled by the speed of sampling so that the time-sharing by the signal sources is sufficient to permit sampling during a steady state condition. A proper balance of these considerations is attainable in the apparatus of the invention.

The embodiment herein described represents a preferred packaging of the component parts of the system. It is apparent, however, that modifications such as the use of individual magnets for each of the galvanometers and a commutating drum in which the commutating aperture is in an upright wall of the drum are within the concept of the invention.

I claim:

1. An apparatus for commutating and modulating electrical signals comprising a plurality of electrical input signal sources; a plurality of electrical devices responsive to amplitude of input signals; electrical interconnections between the signal sources and electrical devices individually; switching means for opening and closing the electrical interconnections for maintaining closed at any one time the electrical interconnections between a fixed plurality of signal sources and electrical devices by the opening of at least one electrical interconnection with the corresponding closing of at least one other electrical interconnection in sequence whereby each signal source is electrically coupled to an electrical device for a fixed period of time; means for serially scanning each electrical device at a predetermined fraction of the fixed period of time and at a predetermined rate; and means for providing output pulses each having a duration which varies with the amplitude of the input signal at the time of scanning.

2. Apparatus in accordance with claim 1 wherein the plurality of signal sources is multiple times greater than the plurality of electrical devices.

3. An apparatus for commutating and modulating electrical signals comprising a plurality of electrical devices responsive to amplitude of electrical input signals; a greater plurality of electrical input signal sources; electrical interconnections between each of the electrical devices and a plurality of signal sources; first means for opening and closing the electrical interconnections; second means cyclically operative with the first means to close in sequence the electrical interconnections between the electrical devices and successive groups of signal sources, said second means being further operative with the first means to maintain closed at any one time the electrical interconnections between a fixed plurality of signal sources and electrical devices by the opening of at least one electrical interconnection with the corresponding closing of at least one other electrical interconnection by the second means in sequence whereby each signal source is electrically coupled to an electrical device for a fixed period of time; means for serially scanning each electrical device at a predetermined fraction of the fixed period of time and at a predetermined rate; and means for providing output pulses each having a duration which varies with the amplitude of the input signal at the time of scanning.

4. An apparatus for commutating and modulating electrical signals comprising a plurality of electrical devices responsive to amplitude of electrical input signals; a greater plurality of electrical input signal sources; electrical interconnections between each of the electrical devices and a plurality of signal sources; a plurality of switches for opening and closing each of the electrical interconnections; means for opening and closing the switches, said means adapted to close the switches at least one at a time to connect each electrical device to a different signal source in sequence and to repeat connecting each electrical device to a different signal source until each electrical device has been connected in sequence to each of its plurality of signal sources, said means being further adapted to maintain closed at any time the switches between a fixed plurality of signal sources and electrical devices by the opening of at least one switch with the corresponding closing of at least one other switch by said means in sequence whereby each signal source is electrically coupled to an electrical device for a fixed period of time; means for serially scanning each electrical device at a predetermined fraction of the fixed period of time and at a predetermined rate; and means for providing output pulses each having a duration which varies with the amplitude of the input signal at the time of scanning.

5. An apparatus for commutating and modulating electrical signals comprising a plurality of electrical input signal sources; a plurality of galvanometers each having a suspension with a mirror mounted thereon; electrical interconnections between the signal sources and galvanometers individually; switching means for opening and closing the electrical interconnections for maintaining closed at any one time the electrical interconnections between a fixed plurality of signal sources and galvanometers by the opening of at least one electrical interconnection with the corresponding closing of at least one other electrical interconnection in sequence whereby each signal source is electrically coupled to a galvanometer for a fixed period of time; means for serially scanning the position of each galvanometer mirror at a predetermined fraction of the fixed period of time; and means for providing signals having a duration proportional to the position of each galvanometer mirror at the time it is scanned.

6. An apparatus for commutating and modulating electrical signals comprising a plurality of galvanometers each having a suspension with a mirror mounted thereon; a greater plurality of electrical input signal sources; electrical interconnections between each of the galvonometers and a plurality of signal sources; first means for opening and closing the electrical interconnections; second means cyclically operative with the first means to close in sequence the electrical interconnections between the galvanometers and successive groups of signal sources, said second means being further operative with the first means to maintain closed at any one time the electrical interconnections between a fixed plurality of signal sources and galvanometers by the opening of at least one electrical interconnection and the corresponding closing of at least one other electrical interconnection by the second means in sequence whereby each signal source is electrically coupled to a galvanometer for a fixed period of time; means for serially scanning the position of each galvanometer mirror at a predetermined fraction of the fixed period of time and at a predetermined rate; and means for providing output pulses each having a duration proportional to the position of each galvanometer mirror at the time it is scanned.

7. An apparatus for commutating and modulating electrical signals comprising a plurality of electrical input signal sources; a plurality of galvanometers each having a suspension with a mirror mounted thereon; means for individually coupling electrically the signal sources and the galvanometers for a fixed period of time; means for directing separate light beams onto the mirror of each galvanometer; reflective means adapted to reflect light beams and focus them on a predetermined spot; a member having an aperture and disposed between the galvanometers and the reflective means; means to cause motion of said member relative to the light beams so that the aperture serially traverses the light beam of each galvanometer to be coincident therewith for a predetermined fraction of the fixed time and at a predetermined rate, the aperture being located in said member to pass light beams therethrough and shaped to vary the time during which the light beam passes through the aperture dependent upon the angle of deflection of the light beam; and a light responsive device disposed to receive light beams passing through the aperture and focussed by the reflective means, whereby the light responsive device produces an output having a time duration proportional to the instantaneous amplitude of each of the input signals.

8. An apparatus for commutating and modulating electrical signals comprising a plurality of galvanometers each having a suspension with a mirror mounted thereon; a greater plurality of electrical input signal sources; electrical interconnections between each of the galvanometers and a plurality of signal sources; switching means for opening and closing the electrical interconnections and for maintaining closed at any one time the electrical interconnections between a fixed plurality of signal sources and galvanometers by the opening of at least one electrical interconnection with the corresponding closing of at least one other electrical interconnection in sequence whereby each signal source is electrically coupled to a galvanometer for a fixed period of time; means for directing separate light beams onto the mirror of each galvanometer; reflective means disposed relative to the galvanometer mirrors to reflect light beams and focus on a predetermined spot light beams reflected from each of the galvanometer mirrors, a member having an aperture and disposed between the galvanometers and the reflective means; means to cause motion of said member relative to the light beams so that the aperture serially traverses the light beam of each galvanometer to be coincident therewith for a predetermined fraction of the fixed time and at a predetermined rate, the aperture being located in said member to pass light beams therethrough and shaped to vary the time during which the light beam passes through the aperture dependent upon the angle of deflection of the light beam; and a light responsive device disposed to receive light beams passing through the aperture and focussed by the reflective means, whereby the light responsive device produces an output having a time duration proportional to the instantaneous amplitude of each of the input signals.

9. Apparatus in accordance with claim 8 wherein each galvanometer has a response which is high for the frequencies of the input signals to be measured and low for the frequencies of noise and other undesired signals.

10. An apparatus for commutating and modulating electrical signals comprising a plurality of galvanometers each having a suspension with a mirror mounted thereon; a greater plurality of electrical input signal sources; electrical interconnections between each of the galvanometers and a plurality of signal sources; a plurality of switches for opening and closing each of the electrical interconnections; means for automatically opening and closing the switches, said means adapted to close the switches at least one at a time to connect each galvanometer to a different signal source in sequence and to repeat to connect each galvanometer to a different signal source in sequence until each galvanometer has been connected in sequence to each of its plurality of signal sources, said means being further adapted to maintain closed at any one time the switches between a fixed plurality of signal sources and galvanometers by the opening of at least one switch with the corresponding closing of at least one other switch in sequence whereby each signal source is electrically coupled to a galvanometer for a fixed period of time; means for directing separate light beams onto the mirror of each galvanometer, said light beams being separately reflected from the mirrors responsive to the deflection of each mirror; reflective means adapted to reflect light beams and focus them on a predetermined spot; a member having an aperture and disposed between the galvanometers and the reflective means; means to cause motion of said member relative to the light beams so that the aperture serially traverses the light beam of each galvanometer to be coincident therewith for a predetermined fraction of the fixed time and at a predetermined rate, the aperture being located in said member to pass light beams therethrough and shaped to vary the time during which the light beam passes through the aperture dependent upon the angle of deflection of the light beam; and a light responsive device disposed to receive light beams passing through the aperture and focussed by the reflective means, whereby the light responsive device produces an output having a time duration proportional to the instantaneous amplitude of each of the input signals.

References Cited in the file of this patent

UNITED STATES PATENTS

| | | |
|---|---|---|
| 1,849,827 | Fitzgerald | Mar. 15, 1932 |
| 1,929,241 | Franklin | Oct. 3, 1933 |
| 2,110,746 | Tolson | Mar. 8, 1938 |
| 2,455,783 | Lang | Dec. 7, 1948 |
| 2,474,244 | Grieg | June 28, 1949 |
| 2,483,281 | Herr | Sept. 27, 1949 |
| 2,807,799 | Rosenthal | Sept. 24, 1957 |
| 2,839,737 | Dalglish | June 17, 1958 |

FOREIGN PATENTS

| | | |
|---|---|---|
| 70,290 | Austria | Oct. 25, 1915 |
| 844,592 | France | Oct. 11, 1938 |

UNITED STATES PATENT OFFICE
CERTIFICATE OF CORRECTION

Patent No. 3,078,449                                  February 19, 1963

James C. Kyle

It is hereby certified that error appears in the above numbered patent requiring correction and that the said Letters Patent should read as corrected below.

Column 1, line 53, for "Theerfore" read -- Therefore --; column 3, line 34, for "eauh" read -- each --; column 10, line 26, after "source" insert -- 1, galvanometer overdamping with respect to signal source --.

Signed and sealed this 1st day of October 1963.

(SEAL)
Attest:

ERNEST W. SWIDER                                DAVID L. LADD Attesting Officer                                     Commissioner of Patents